June 6, 1961

C. C. FUERST ET AL 2,986,985

SYNCHRONIZING SHUTTER MECHANISM

Original Filed Aug. 16, 1957

CARL C. FUERST
FRANCIS A. WILLIAMS
INVENTORS

BY R. Frank Smith

Steve W. Grambow

ATTORNEYS

June 6, 1961
C. C. FUERST ET AL
2,986,985
SYNCHRONIZING SHUTTER MECHANISM
Original Filed Aug. 16, 1957
3 Sheets-Sheet 2
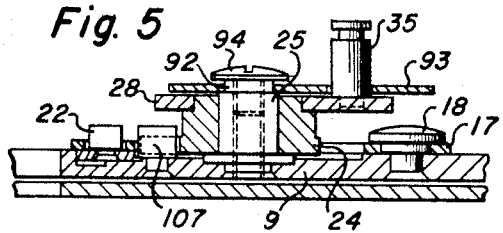
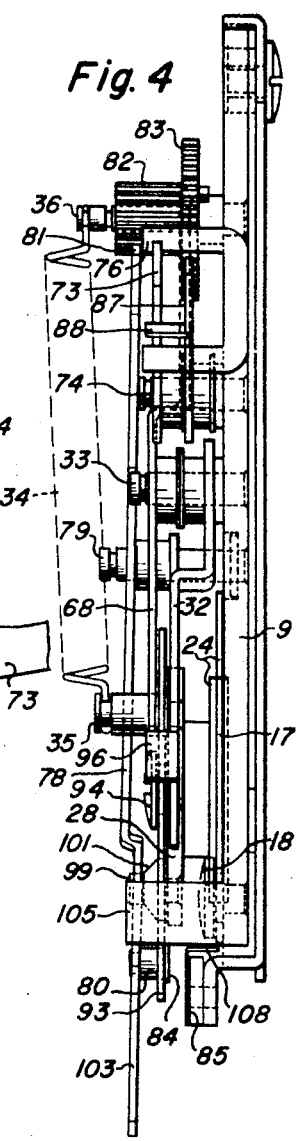
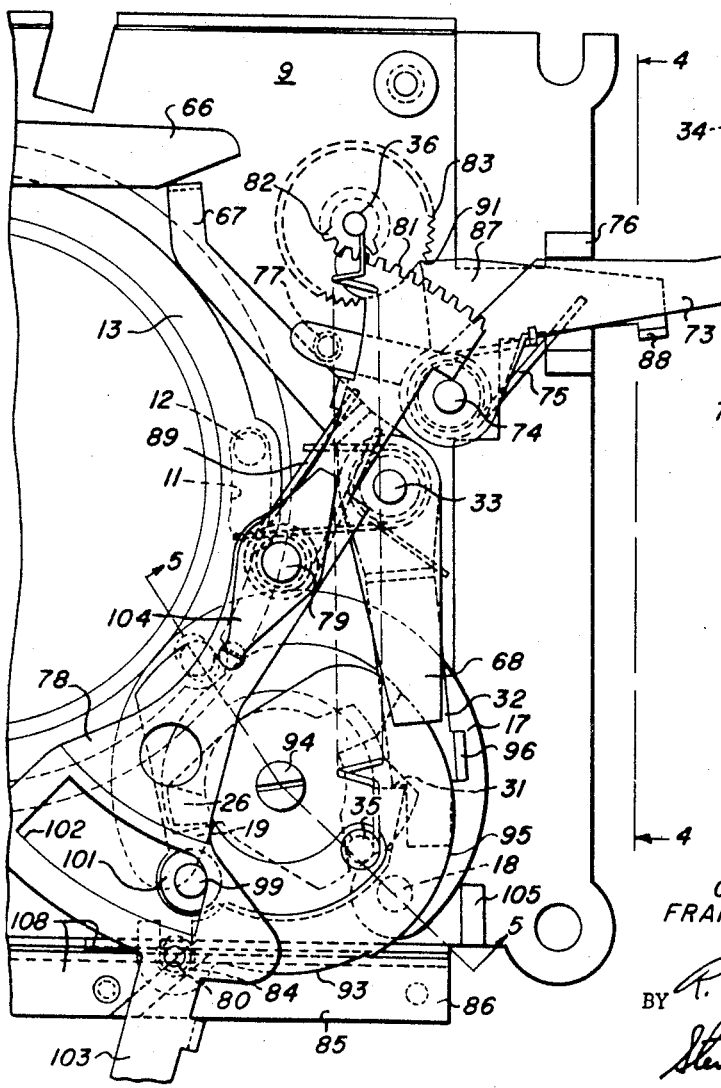
CARL C. FUERST
FRANCIS A. WILLIAMS
INVENTORS
BY R. Frank Smith
Steve W. Grambau
ATTORNEYS

CARL C. FUERST
FRANCIS A. WILLIAMS
INVENTORS

BY R. Frank Smith
Steve W. Grambau
ATTORNEYS

United States Patent Office 2,986,985
Patented June 6, 1961

2,986,985
SYNCHRONIZING SHUTTER MECHANISM
Carl C. Fuerst and Francis A. Williams, Rochester, N.Y., assignors to Eastman Kodak Company, Rochester, N.Y., a corporation of New Jersey
Original application Aug. 16, 1957, Ser. No. 678,490. Divided and this application Apr. 4, 1960, Ser. No. 19,648
2 Claims. (Cl. 95—63)

This invention relates generally to cameras and more specifically to an improved synchronizing shutter mechanism for a camera.

This is a divisional case of applicants' U.S. pending application Serial No. 678,490, filed August 16, 1957.

One of the objects of the present invention is to provide an improved shutter mechanism that is compact, efficient in operation and reliable in performance.

Another object of the invention is the provision of an improved shutter mechanism having increased reliability, accuracy and ruggedness of construction.

Still another object of the invention is to provide an inexpensive shutter mechanism having a reasonable range of exposures including a relatively high-speed exposure.

Another object of this invention is to provide a shutter mechanism having a minimum number of parts.

A still further object of this invention is the provision of an improved shutter mechanism that may be constructed largely of metal stampings and in which there are relatively few parts requiring careful adjustment in assembly.

One more object of this invention is the provision of a shutter mechanism having an improved exposure speed control mechanism having means for easily, accurately and reliably adjusting each of the individual exposure speeds.

A further object of this invention is the provision of a shutter having an improved synchronizing mechanism.

And another object of the invention is the provision of a shutter having improved means for opening and closing the shutter blades that is positive in operation and eliminates shutter backlash.

Another important object of this invention is to provide an improved synchronizing mechanism adapted during its run-down movement to actuate a cam in engagement with a shutter release member to gradually urge the release member in a direction to release the shutter.

Objects and advantages other than those set forth above will be apparent from the following description when read in connection with the accompanying drawing, in which:

FIG. 3 is an enlarged fragmentary view of a portion of the shutter of FIG. 1 showing the shutter parts in a cocked position;

FIG. 4 is a side elevation view of the structure of FIG. 3 looking at it from 4—4;

FIG. 5 is a fragmentary view in section taken along line 5—5 of FIG. 3;

Figure 1:
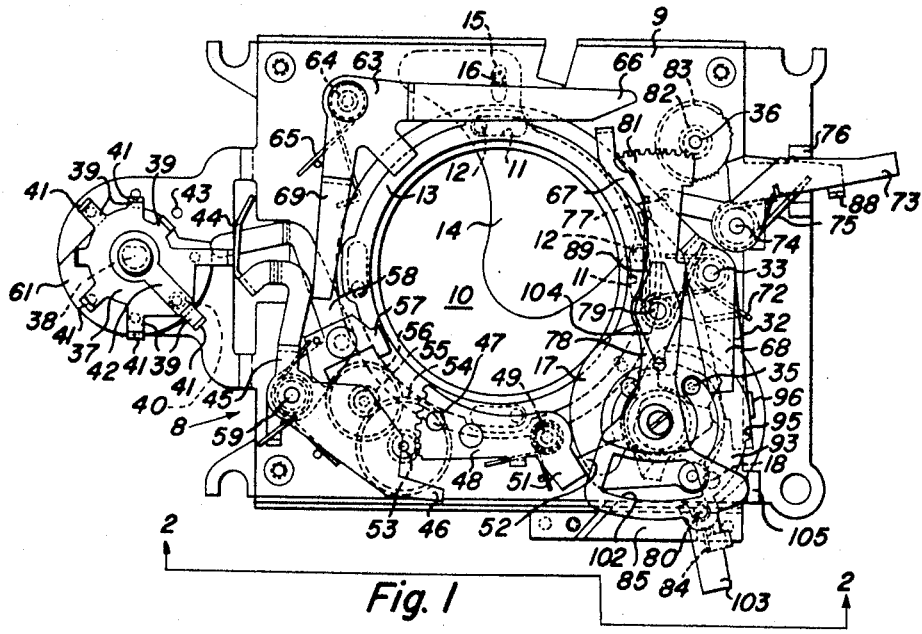
FIG. 1 is a front elevation view showing a shutter mechanism embodying this invention.
Figure 2:
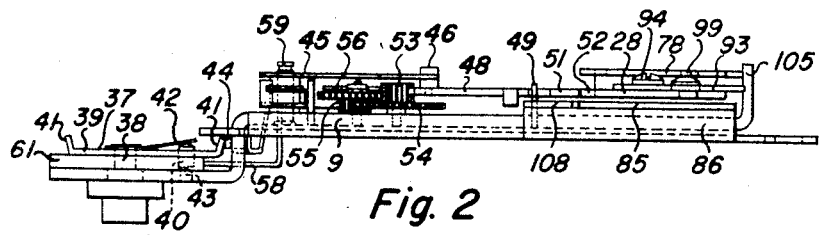
FIG. 2 is a side elevation view of the shutter of FIG. 1 looking at it from 2—2.

As shown in the drawings, this invention is embodied in a shutter mechanism 8 of the type positioned behind the lens or objective of a camera, not shown, as distinguished from the shutter mechanisms commonly referred to as between-the-lens shutters.

The shutter 8 has a base 9 provided with a central aperture 10 through which light may be transmitted to a sensitized material, not shown, as is well known in the art. The base 9 has a plurality of arcuate slots 11 shown dotted formed adjacent the aperture 10 for receiving complementary pins 12 mounted on a blade ring 13. The shutter blades 14, only one of which is shown, are interposed between the blade ring 13 and the base 9 and have an opening through which the pin 12 extends. The shutter blades 14 each further have an elongated slot 15 shown dotted for receiving a pin 16 mounted on the base 9 which forms the pivot for the shutter blade 14. Movement of the blade ring 13 in a clockwise and counterclockwise direction causes the shutter blades 14 to open and close as is well known.

Figure 6:
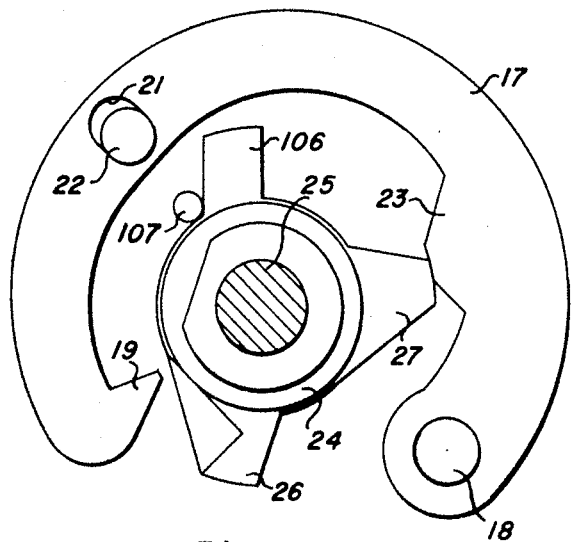
FIG. 6 is a plan view showing a portion of the shutter mechanism of FIG. 3.
Figure 7:
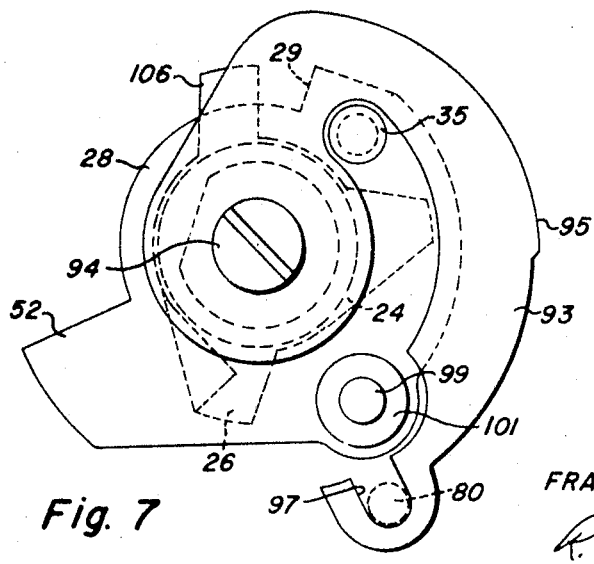
FIG. 7 is a view similar to FIG. 6 showing the shutter cocking disk, the shutter release cam and the master member.

The mechanism for imparting a counterclockwise and clockwise rotation to the blade ring 13 comprises a crescent-shaped lever 17 as best seen in FIG. 6 having one end mounted on a stud 18 carried by the base 9. The lever 17 has a radially inwardly extending lug 19 at its other end and a substantially radially extending elongated slot 21 intermediate the ends for receiving a pin 22 carried by the blade ring 13. The lever 17 also has another radially inwardly extending lug 23 near its pivoted end almost diametrically opposed from the lug 19. A master member 24 is rotatably mounted on a stud 25 carried by the base 9 centrally of the lever 17, and has a pair of ears 26, 27 angularly spaced from one another adapted to cooperate with the respective lugs 19, 23. When the master member 24 is rotated in a counterclockwise direction from a shutter-cocked position, the ear 26 engages lug 19 to pivotally urge the lever 17 in one direction to open the shutter blades 14, and then the other ear 27 engages the lug 23 to pivotally move the lever 17 in the opposite direction to close the shutter blades 14. A shutter cocking disk 28 is rigidly secured to the master member 24 so as to be rotatable therewith as seen in FIGS. 5 and 7, and has a shoulder 29 shown dotted engageable by a lug 31 of a lever 32 pivotally mounted at 33 to hold the disk 28 in the shutter cocked position as seen in FIG. 3. A shutter power spring 34 has one end connected to a lug 35 carried by the cocking disk 28 and the other end secured to a stud 36.

This shutter 8 is provided with an improved exposure speed control mechanism for providing seven different instantaneous time exposure speeds and a bulb exposure. A speed selector cam 37 is shown as a disk mounted on a stud 38 and having eight radially extending arms 39 of different lengths with upturned lugs 41 at each end. The cam 37 is provided with a detent 40 urged by spring 42 adapted to cooperate with eight openings 43 in the base 9 to selectively position the cam 37 with one of the arms 39 in engagement with a flange 44 formed by one end of a pivotally mounted control lever 45. The opposite end 46 of the lever 45 cooperates with a pin 47 of a gear segment 48 pivoted at 49 and forming a part of a retard system of known type. The gear segment 48 is spring-biased to urge the pin 47 into engagement with the lever end 46 when the shutter 8 is in a cocked position. Pivotal movement of the control lever 45 by the speed selector cam 37 causes the gear segment 48 to move bringing the tail 51 of the gear segment 48 more or less into engagement with a lug 52 carried by the cocking disk 28 as seen in FIGS. 1 and 7 so that the lug 52 will strike and pivot the gear segment 48 according to its position. The amount of pivotal movement of the gear segment 48, which is impeded by the remaining parts of the retard system consisting of a pinion 53, gear 54, pinion 55, start wheel 56 and pallet 57 as seen in FIG. 1, determines the length of time the shutter blades 14 remain open. The pallet 57 is mounted on a lever 58 pivoted at 59 and actuable by a cam 61 mounted on the stud 38 causing the pallet 57 to be selectively engaged or disengaged from the start wheel 56.

The bulb exposure mechanism includes a bell crank 63 pivoted at 64 and biased by a spring 65 in a clockwise direction. In all positions of the speed selector cam 37 except bulb, an arm 66 of the bell crank 63 is urged into engagement with one end of a lever 67 as shown in FIG. 3 holding the lever 67 in a disengaged position with its other end 68 withdrawn from the path of the lug 35 of the cocking disk 28. With the selector cam 37 in a bulb position as seen in FIG. 1, the lever 45 engages the other arm 69 of the bell crank 63 urging the bell crank in a counterclockwise direction withdrawing arm 66 from engagement with the end of the lever 67. The lever 67 which is pivoted at 33 is biased by a spring 72 in a clockwise direction urging its end 68 in a position to intercept the lug 35 of the cocking disk 28. A shutter release lever 73, pivoted at 74 and urged by spring 75 in a counterclockwise direction against a stop 76, has a pin 77 shown dotted at one end engaging the lever 67. Since spring 75 is stronger than spring 72, the lever is urged counterclockwise into the disengaged position as long as the release member 73 is undepressed. Depressing the release lever 73 in a clockwise direction to make an exposure, withdraws the pin 77 permitting the lever 67 to pivot clockwise causing end 68 to intercept the lug 35 stopping the disk 28 and master member 24 when the shutter blades 14 are in a position of maximum opening. When the release lever 73 is released, the pin 77 cams the lever 67 counterclockwise by virtue of the stronger spring 75 withdrawing its end 68 from the lug 35 and permitting the shutter blades 14 to close.

The shutter 8 is provided with a synchronizing mechanism for flash lamp use to assure that the maximum brilliance of the flash coincides with the maximum opening of the shutter blades 14. The synchronizing mechanism is adapted to provide synchronization for flash lamps having a time lag of as much as 20 milliseconds before the flash reaches the point of maximum brilliance, and for flash lamps in which there is substantially no time lag before the flash reaches the point of maximum brilliance. The synchronizing mechanism comprises a synchronizer lever 78 pivoted at 79 and having one end terminating in a gear segment 81 engaging a pinion 82 mounted on stud 36. The other end of the lever 78 carries a pin 80 having a switch contact 84 adapted to slidably engage a fixed switch contact 85 mounted on an adjustable nylon block 86. A gear 83 secured to stud 36 and rotatable with pinion 82 cooperates with a pawl 91 formed by a lever 87 pivoted at 74 to prevent clockwise rotation of the gear 83 and hence counterclockwise movement of the synchronizer lever 78 while the shutter 8 and lever 78 are being cocked. The pawl 91 further holds the synchronizer lever 78 in a tensioned or cocked position which is attained when the lever 78 is moved clockwise until it engages a stop. The lever 78 is driven by a spirng 89 in a counterclockwise direction and has a lug 88 which is engaged by the shutter release lever 73 when the lever 73 is depressed withdrawing the pawl from the gear 83 and permitting the gear 83 and synchronizer lever 78 to run down. A shutter release cam 93 as best seen in FIGS. 5 and 7 pivots about a shoulder 92 formed by the stud 25 and is held thereon by cap screw 94. The cam 93 has a cam surface 95 adapted to engage an ear 96 carried by the shutter release lever 32, and a slot 97 at one end for receiving the pin 80 carried by the synchronizer lever 78 so that the lever 78 and the shutter release cam 93 pivotally move together. A pin 99 having a conical base 101 is secured to the shutter cocking disk 28 and extends through an arcuate slot 102 in the synchronizer lever 78 so that the lever 78 may move independently of the shutter cocking disk 28 from its tensioned position. When the synchronizer lever 78 is pivoted clockwise by handle 103 into the tensioned position as shown in FIG. 3, the edge of the slot 102 engages the pin 99 and rotates the shutter cocking disk 28 in a clockwise direction into its shutter-cocked position with the lug 31 engaging the shoulder 29 of the cocking disk 28. As the disk 28 is rotated clockwise, the slanted edge of ear 26 cams the lug 19 upwardly so that the ear 26 may pass thereunder and behind the lug 19 as seen in FIG. 3. The conical shank 101 of the pin 99 cams the switch-carrying end of the synchronizing lever 78 in a transverse direction relative to its movement against the bias of a spring 104 and breaks the engagement between the switch contacts 84, 85 throughout the travel of the cocking disk 28 and synchronizer lever 78 into their cocked positions. When the shutter release lever 73 is depressed, the synchronizer lever 78 is released which runs off the conical shank 101 into the plane of the stationary switch contact 85 causing the contacts 84, 85 to become slidably engaged completing the flash lamp circuit. The synchronizer lever 78 and shutter release cam 93 run down together until the synchronizer lever 78 engages a stop 105. The release cam 93 which is in engagement with the ear 96 during the run down gradually urges the ear 96 and lever 32 in a counterclockwise direction withdrawing the lug 31 from engagement with the shoulder 29 of the shutter cocking disk 28 releasing the shutter. When released, the shutter cocking disk 28 and master member 24 run down in a counterclockwise direction causing the shutter blades 14 to open and close to make an exposure as explained heretofore. A lug 106 of the master member 24 engages a stop member 107 to stop further rotation of the disk 28 and member 24, and the ear 27 engages lug 23 in the stopped position to positively hold the lever 17 and prevent any possible backlash of the shutter blades 14 as seen in FIG. 6. In this position, the pin 99 engages the edge of the slot 102 causing the conical shank 101 to again urge the synchronizer lever 78 in a transverse direction breaking the engagement between the switch contacts 84, 85 at the completion of the exposure. The nylon block 86 further carries another switch contact 108 having a portion thereof transverse to the aforementioned switch contact 85 and separate therefrom adapted to be engaged by the free end of lever 17 when the shutter blades 14 are in a position of maximum opening for instantaneous flash lamps having no appreciable time lag. The nylon block 86 carrying the switch contacts 85, 108 is adjustable laterally through the aid of an appropriate scale, not shown, to vary the interval of engagement of the switch contacts 85, 84 to accommodate different types of flash lamps having different time lags.

In the operation of this invention, let us assume initially that the speed selector cam 37 is placed in the bulb position as shown in FIG. 1. The synchronizer lever 78 is tensioned by moving the lever 78 in a clockwise direction against a stop and into a cocked position as maintained by pawl 91 engaging gear 83 as seen in FIG. 3. Movement of the synchronizer lever 78 in a clockwise direction causes the shutter cocking disk 28 and master member 24 to be moved in a clockwise direction until the lug 31 engages the shoulder 29 to releasably lock the disk 28 and member 24 in the shutter-cocked position. Depression of the shutter release lever 73 releases the synchronizer lever 78 which runs down in a counterclockwise direction until it engages the stop 105. The shutter release cam 93 which is rotated therealong by virtue of the pin 98 urges the lever 32 in a counterclockwise direction withdrawing the lug 31 from the shoulder 29 to release the shutter-cocking disk 28 and master member 24. The disk 28 and member 24 are rotated in a counterclockwise direction by virtue of the power spring 34 and the lug 35 is intercepted by the end 68 of lever 67 when the shutter blades 14 are in a position of maximum opening. The shutter blades 14 remain in the maximum open position until the shutter release lever 73 is released by the operator at which time the lever 67 is pivoted in a counterclockwise direction by the pin 77 withdrawing the end 68 of the lever 67 from the lug 35 and permitting the shutter blades 14 to close.

Let us now assume that the speed selector cam 37 is moved into one of the instantaneous time exposure positions. The bell crank 63 is urged in a clockwise direction engaging and holding the bulb lever 67 in the disengaged position. The speed control cam 37 pivotally moves the retard control lever 45 the proper amount to properly position the gear retard segment 48 depending upon the exposure time selected. The synchronizer lever 78, shutter cocking disk 28 and master member 24 are tensioned and cocked in the same manner as indicated for bulb exposure. To make the exposure, the shutter release member 73 is depressed releasing the synchronizer lever 78 which runs down in a counterclockwise direction closing the flash lamp contacts 84, 85 as it runs down. The shutter release cam 93 which travels with the synchronizer lever 78 releases the shutter cocking disk 28 and master member 24 which are rotated by the power spring 34 to a stop position 107 causing the shutter blades 14 to open and close. The interval of time that the shutter blades 14 are fully open is controlled by the tail 51 of the retard gear segment 48 which is engaged by the lug 52 of the shutter cocking disk 28 as it runs down to its stop position 107.

The invention has been described in detail with particular reference to preferred embodiments thereof, but it will be understood that variations and modifications can be effected within the spirit and scope of the invention as described hereinabove and as defined in the appended claims.

We claim:

1. In a shutter blade driving mechanism for a camera, the combination of: a blade ring; a plurality of shutter blades adapted to be moved into open and closed positions upon oscillatable movement of said blade ring; a pin carried by said blade ring; a crescent-shaped lever pivoted at one end and having a radially inwardly directed first lug formed by said other end, said lever having a substantially radially extending elongated slot intermediate its ends adapted to receive said pin and move said blade ring upon pivotal movement of said lever, said lever further forming a radially inwardly extending second lug near said one end substantially diametrically opposed from said first lug; a spring-biased shutter member mounted centrally of said lever and having a first ear and a second ear, said first ear having a slanted edge; means for moving said shutter member in one direction against the bias of its spring into a shutter-cocked position, said slanted edge of said first ear camming said first lug upwardly to permit said first ear to pass thereunder and behind said first lug; latch means for holding said shutter member in the shutter-cocked position; and means for releasing said latch means whereby said shutter member is urged in a direction opposite to said one direction causing said first ear to engage and pivotally urge said first lug and lever in one direction causing said blade ring to open said shutter blades, said second ear engaging and pivotally urging said second lug and lever in the opposite direction causing said blade ring to close said shutter blades to complete the exposure.

2. The invention as defined in claim 1 wherein said shutter member comprises a disk forming a shoulder, and said latch means comprising a pivoted lever having a lug adapted to releasably engage said shoulder.

References Cited in the file of this patent

UNITED STATES PATENTS 2,331,569     Pirwitz _____ Oct. 12, 1943